United States Patent [19]

Gray

[11] Patent Number: 4,495,913
[45] Date of Patent: Jan. 29, 1985

[54] IGNITION CURRENT SENSOR FOR AN ELECTRONIC SPEED CONTROL SYSTEM

[75] Inventor: Larry O. Gray, Laurinburg, N.C.

[73] Assignee: Dana Corporation, Toledo, Ohio

[21] Appl. No.: 542,560

[22] Filed: Oct. 18, 1983

Related U.S. Application Data

[63] Continuation-in-part of Ser. No. 475,555, Mar. 15, 1983, abandoned.

[51] Int. Cl.³ ............................................... F02D 11/10
[52] U.S. Cl. ..................................... 123/352; 123/351; 123/198 D; 123/335; 180/169; 180/179; 180/170
[58] Field of Search ................ 324/170, 402; 123/351, 123/352, 335, 198 D; 180/169, 170, 171, 176, 178, 179

[56] References Cited

U.S. PATENT DOCUMENTS

| | | | |
|---|---|---|---|
| 2,927,268 | 3/1960 | Haggai et al. | 324/170 |
| 3,268,810 | 8/1966 | Reiner | 324/170 |
| 3,573,609 | 4/1971 | Vaher | 324/170 |
| 3,686,569 | 8/1972 | Neilsen | 324/170 |
| 3,828,742 | 8/1974 | Weis | 123/352 |
| 3,878,915 | 4/1975 | Purland et al. | 180/105 |
| 4,008,430 | 2/1977 | Blum | 324/402 |
| 4,086,888 | 5/1978 | Roberts | 123/352 |
| 4,098,242 | 7/1978 | Anderson | 123/102 |
| 4,355,607 | 10/1982 | Blaney | 123/350 |

FOREIGN PATENT DOCUMENTS

| | | | |
|---|---|---|---|
| 2054912 | 6/1979 | United Kingdom | 123/352 |
| 1592061 | 7/1981 | United Kingdom | 123/352 |

*Primary Examiner*—Ronald B. Cox
*Attorney, Agent, or Firm*—Fraser, Barker, Purdue & Clemens

[57] ABSTRACT

An electronic circuit for disengaging an electronic speed control system when the rate of change of the automobile engine speed exceeds a predetermined amount is disclosed. A ferrite or powdered iron ring current transformer generates an input signal to the electronic circuit from one of the spark plug wires in the engine. The pulses from the ring current transformer are passed through a monostable multivibrator circuit and a filter network to a differentiator. The output of the differentiator is connected to a high limit detector and a low limit detector. When the rate of change of engine speed exceeds a predetermined amount, a signal is generated to disengage the speed control circuit.

15 Claims, 3 Drawing Figures

IGNITION CURRENT SENSOR FOR AN ELECTRONIC SPEED CONTROL SYSTEM

CROSS REFERENCE TO RELATED APPLICATION

This application is a continuation-in-part of co-pending application Ser. No. 475,555 filed Mar. 15, 1983, now abandoned.

BACKGROUND OF THE INVENTION

1. Field of the Invention

The present invention relates in general to automotive speed control systems and in particular to an electronic circuit for disengaging an electronic speed control system when the rate of change of the automobile engine speed exceeds a predetermined amount.

Automotive speed control systems have been developed wherein a speed sensor supplies signals to an engine throttle actuator which enables a vehicle to be maintained at a constant preselected speed. One serious problem of such automotive cruise control systems is that the engine may overrun if the clutch is depressed (in an automobile utilizing a manual transmission) or if the shift selector is moved to neutral (in an automobile utilizing an automatic transmission) while the speed control system is holding the engine throttle in an open position. One prior solution to this problem was to supply a clutch or shift selector disengagement switch which was positioned to be actuated by actual movement of the transmission mechanism and which provided a signal to disengage the speed control system when the clutch was depressed or the shift selector was moved to neutral. However, since there are a large number of different transmission arrangements for use in the many different types of automobiles in use, such an automotive aftermarket speed control device is undesirable because of its cost and complexity.

2. Description of the Prior Art

U.S. Pat. No. 4,355,607 to Blaney discloses a safety disengagement device for an automotive speed control system. The device includes a circuit which compares a present engine speed signal with a previous engine speed signal furnished after a time delay to produce an output signal when a preselected engine speed differential occurs during the delay period. The output signal is utilized to disengage the speed control system directly or, alternatively, to turn off the engine ignition system.

U.S. Pat. No. 3,828,742 to Weis discloses a control system for monitoring and controlling an engine as a function of engine speed. The control system includes a control device which continuously monitors engine speed sensed through a magnetic pickup means and causes engine shutdown by means of an engine shutdown device when an overspeed condition occurs. In addition, the control device actuates a warning device when an underspeed condition occurs.

Other related speed control devices are disclosed in U.S. Pat. Nos. 3,878,915 to Purland et al. and 4,098,242 to Anderson.

SUMMARY OF THE INVENTION

The present invention relates to an electronic circuit for disengaging an electronic speed control system when the rate of change of the automobile engine speed exceeds a predetermined amount. A ferrite or powdered iron ring current transformer generates an input signal to the electronic circuit from one of the spark plug wires in the engine. The pulses from the ring current transformer are passed through a monostable multivibrator circuit and a filter network to a differentiator. The output of the differentiator is connected to a high limit detector and a low limit detector. When the rate of change of engine speed exceeds a predetermined amount, a signal is generated to disengage the speed control circuit.

It is an object of the present invention to provide an electronic circuit for disengaging an electronic speed control system when the vehicle engine speed exceeds a fixed rate of change.

It is another object of the present invention to provide an electronic speed control disengagement circuit which is readily adaptable to a wide range of vehicles and is simple and inexpensive in construction.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
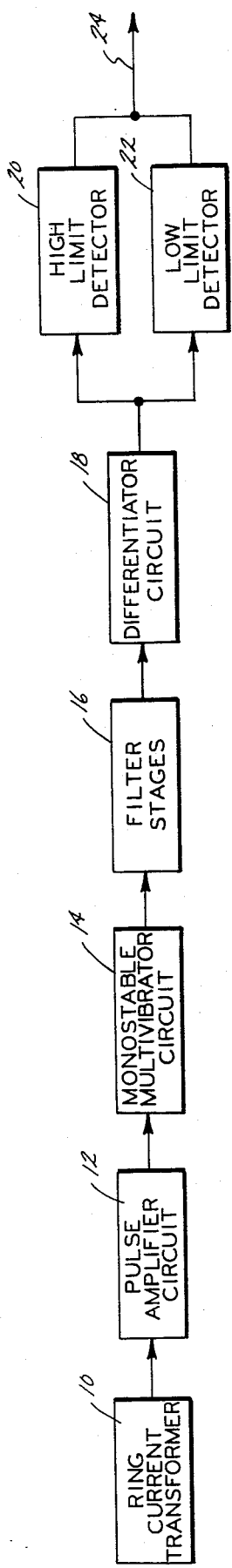
FIG. 1 is a block diagram of an electronic circuit for disengaging an electronic speed control system in accordance with the present invention.

Referring now to the drawings, there is illustrated in FIG. 1 a block diagram of an electronic circuit for disengaging an electronic speed control system in accordance with the present invention. A ring current transformer 10 is adapted to be disposed about a spark plug wire (not shown) in the automobile engine. The ring current transformer 10 senses the ignition current periodically applied through the spark plug wire and generates a pulse train signal in response thereto to a pulse amplifier circuit 12. Conventional automobiles utilize a four stroke internal combustion engine. Therefore, it will be appreciated that one pulse is generated by the ring current transformer 10 for every two revolutions of the automobile engine.

The pulse amplifier circuit 12 is connected to a monostable multivibrator circuit 14. The monostable multivibrator circuit 14 is conventional in the art and generates an output pulse upon the receipt of each input pulse from the pulse amplifier 12. The output pulses from the monostable multivibrator circuit 14 are uniform in magnitude and duration and are fed through several filter stages 16 to a differentiator circuit 18. The differentiator circuit 18 generates an output signal which is proportional to the rate of change of engine speed, as determined by the frequency of the pulses generated by the monostable multivibrator circuit 14.

The output signal of the differentiator circuit 18 is fed to a high limit detector 20 and a low limit detector 22. The high and low limit detectors 20 and 22 compare the output signal of the differentiator circuit 18 with respective predetermined high and low threshold signals. The outputs of the high and low limit detectors 20 and 22 are connected to an output line 24. The output line 24 can be connected to a conventional brake detection circuit (not shown) of the electronic speed control device (see FIG. 3). When the rate of change of engine speed increases above the high threshold level or decreases below the low threshold level, a signal is generated on the output line 24 by the high limit detector 20 or low limit detector 22, respectively, to the brake detector circuit so as to disengage the electronic speed control system from the engine throttle actuator in a known manner.

Figure 2:
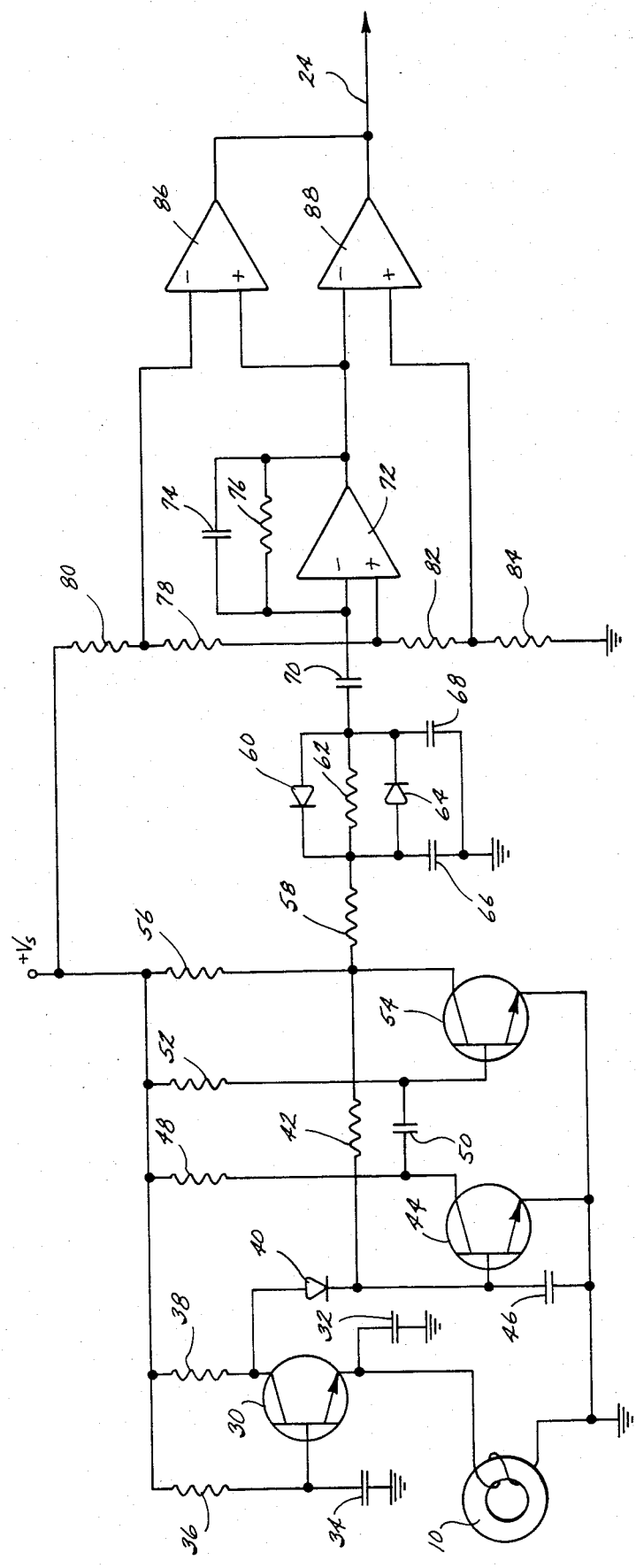
FIG. 2 is a schematic diagram of the electronic circuit of FIG. 1.

Referring now to FIG. 2, there is illustrated a schematic diagram of the electronic circuit of FIG. 1. The ring current transformer 10 can be formed of ferrite or powdered iron. When inserted through the center of the ring current transformer 10, the spark plug wire operates as a primary circuit for the transformer 10. The secondary circuit of the transformer 10 is connected between the emitter of a transistor 30 and ground potential. The emitter of the transistor 30 is also connected through a capacitor 32 to ground potential. The base of the transistor 30 is connected through a capacitor 34 to ground potential and through a resistor 36 to a +Vs voltage source. The collector of the transistor 30 is connected through a resistor 38 to the +Vs voltage source. The collector of the transistor 30 is also connected to the anode of a diode 40. The transistor 30 and its associated circuit elements comprise the pulse amplifier circuit 12.

The cathode of the diode 40 is connected to a resistor 42, the base of a transistor 44, and a capacitor 46. The emitter of the transistor 44 and the capacitor 46 are both connected to ground potential. The collector of the transistor 44 is connected through a resistor 48 to the +Vs voltage source. The collector of the transistor 44 is also connected to a capacitor 50. The capacitor 50 is connected to a resistor 52 and the base of a transistor 54. The resistor 52 is connected to the +Vs voltage source. The emitter of the transistor 54 is connected to ground potential. The collector of the transistor 54 is connected to the resistor 42, a resistor 56, and a resistor 58. The resistor 56 is connected to the +Vs voltage source. The transistors 44 and 54 and their associated circuit elements comprise the monostable multivibrator circuit 14.

The resistor 58 is connected to the junction of the cathode of a diode 60, a resistor 62, the anode of a diode 64, and a capacitor 66. The anode of the diode 60, the resistor 62, and the cathode of the diode 64 are all connected to a capacitor 68 and a capacitor 70. The capacitor 66 and the capacitor 68 are both connected to ground potential. The resistors 58 and 62, the capacitors 66 and 68, and their associated circuit elements comprise the filter stages 16.

The capacitor 70 is connected to the inverting input of an operational amplifier 72. A capacitor 74 and a resistor 76 are connected in parallel between the output and the inverting input of the operational amplifier 72. The non-inverting input of the operational amplifier 72 is connected through a resistor 78 and a resistor 80 to the +Vs voltage source. The non-inverting input of the operational amplifier 72 is also connected through a resistor 82 and a resistor 84 to ground potential. The operational amplifier 72 and its associated circuit elements comprise the differentiator circuit 18.

The output of the operational amplifier 72 is connected to the non-inverting input of an operational amplifier 86 and the inverting input of an operational amplifier 88. The inverting input of the operational amplifier 86 is connected between the resistors 78 and 80. Similarly, the non-inverting input of the operational amplifier 88 is connected between the resistors 82 and 84. The outputs of the operational amplifiers 86 and 88 are connected to the output line 24. The operational amplifiers 86 and 88 and their associated circuit elements comprise the high and low limit detectors 20 and 22, respectively.

In operation, the ring current transformer 10 senses the ignition current periodically applied to the spark plug wire by the automobile engine ignition system and generates a pulse signal in response thereto to the pulse amplifier circuit 12. The pulse amplifier circuit 12 amplifies the pulse signals from the ring current transformer 10 and feeds the amplified pulse signals to the monostable multivibrator circuit 14. The output of the monostable multivibrator circuit 14 is a clean square wave pulse train having a frequency which is proportional to the speed of the engine.

The output of the monostable multivibrator circuit 14 is fed to a first low pass filter in the filter stages 16. The first low pass filter consists of the resistor 58 and the capacitor 66. The output of the first low pass filter is a direct current voltage signal which is proportional to the engine speed. Because of the square wave input signal, however, the output signal from the first low pass filter typically contains a relatively large amount of ripple. Thus, the output signal from the first low pass filter is applied to a second low pass filter, consisting of the resistor 62 and the capacitor 68. The values of the resistor 62 and the capacitor 68 are selected to provide a relatively long time constant, thereby greatly reducing the amount of ripple in the output signal generated to the differentiator circuit 12. Thus, it can be seen that the output signal of the filter stages 16 will remain at a relatively constant level so long as the speed of the engine does not change rapidly.

The output signal from the filter stages 16 is fed to the operational amplifier 72 where it is compared against a predetermined voltage level signal determined by the voltage divider network consisting of the +Vs voltage source and the resistors 78, 80, 82, and 84. Typically, the values of the resistors 78, 80, 82, and 84 are selected such that the predetermined voltage level signal is equal to one-half of the +Vs voltage level. The operational amplifier 72 compares the value of the output signal from the filter stages 16, which output signal is proportional to the speed of the engine, to the predetermined voltage level signal to generate an output signal representing the rate of change of engine speed. The rate of change of engine speed can be expressed in the output signal as a variation above or below the value of the predetermined voltage level signal. Thus, if the speed of the engine is increasing, the output signal from the operational amplifier 72 will be a corresponding amount less than the value of the predetermined voltage level signal. Similarly, if the speed of the engine is decreasing, the output signal from the operational amplifier 72 will be a corresponding amount greater than the value of the predetermined voltage level signal. Of course, if the speed of the engine remains constant, the output signal from the operational amplifier 72 will equal the value of the predetermined voltage level signal.

As mentioned previously, the output signal from the differentiator circuit 18 is fed to both the high and low limit detectors 20 and 22. The high and low limit detectors 20 and 22 determine if the value of the output signal falls within the predetermined range defined by the respective high and low threshold signals obtained from the above-mentioned voltage divider network. Typically, the values of the resistors 78, 80, 82, and 84 are selected to provide high and low threshold signals which are equal amounts above and below, respectively, the value of the predetermined voltage level signal. Thus, if the value of the output signal from the differentiator circuit 18, which output signal is proportional to the rate of change of the speed of the engine, rises above the value of the high threshold signal or falls below the value of the low threshold signal, the appropriate limit detector 20 or 22 will generate a signal on the output line 24 to disengage the electronic speed control system.

In normal operation, the automobile engine will be maintained at a relatively constant speed by the electronic speed control system. Any changes in the speed of the engine, such as when the automobile is climbing a hill, will typically be small and slowly occurring. So long as such operation of the engine is maintained, neither of the diodes 60 and 64 are conducting because of the voltage required to forward bias them. The resistor 62 of the second filter stage conducts all of the signal given such operation.

However, if the speed of the engine changes rapidly, such as when the load on the engine is quickly removed by depressing the clutch or moving the shift selector to neutral, the average output voltage from the first filter stage will change dramatically. Assuming that this change in engine speed involves a rapid increase, the average voltage from the first filter stage will rise sharply. If the rise in voltage is sufficiently large and occurs faster than the time constant of the second filter stage will permit it to react, the diode 64 will be forward biased, thereby bypassing the resistor 62. Thus, the reaction time of the electronic circuit of the present invention is not delayed by the relatively long time constant of the second filter stage and the electronic speed control system will be rapidly disengaged by the low limit detector 22. Similarly, if the change in engine speed involves a rapid decrease, the diode 60 will be forward biased and the high limit detector 20 will disengage the electronic speed control circuit.

Even when the resistor 62 is bypassed by the operation of one of the diodes 60 or 64, it is desirable to retain a very small reaction time delay so that the electronic circuit of the present invention does not disengage the electronic speed control system in response to momentary and isolated fluctuations in engine speed. Such a momentary fluctuation of engine speed may occur when the automobile passes over the crest of a sharp hill or when an automatic transmission shifts gears. In these and other instances, it would not be desirable to disengage the speed control system. The capacitor 68 of the second filter stage prevents the voltage of the signal being fed to the operational amplifier 72 from changing instantaneously. If the engine speed rapidly increases momentarily, the excess current in the signal from the first filter stage will be shorted through the capacitor 68 to ground potential. The differentiator circuit 18 will not be actuated until after a very short time delay, the length of the time delay being determined by the size of the capacitor 68. Thus, the present invention provides a means for preventing momentary fluctuations in the engine speed signal of less than a predetermined amount and durations from actuating the differentiator circuit 18 to disengage the speed control circuit.

Figure 3:
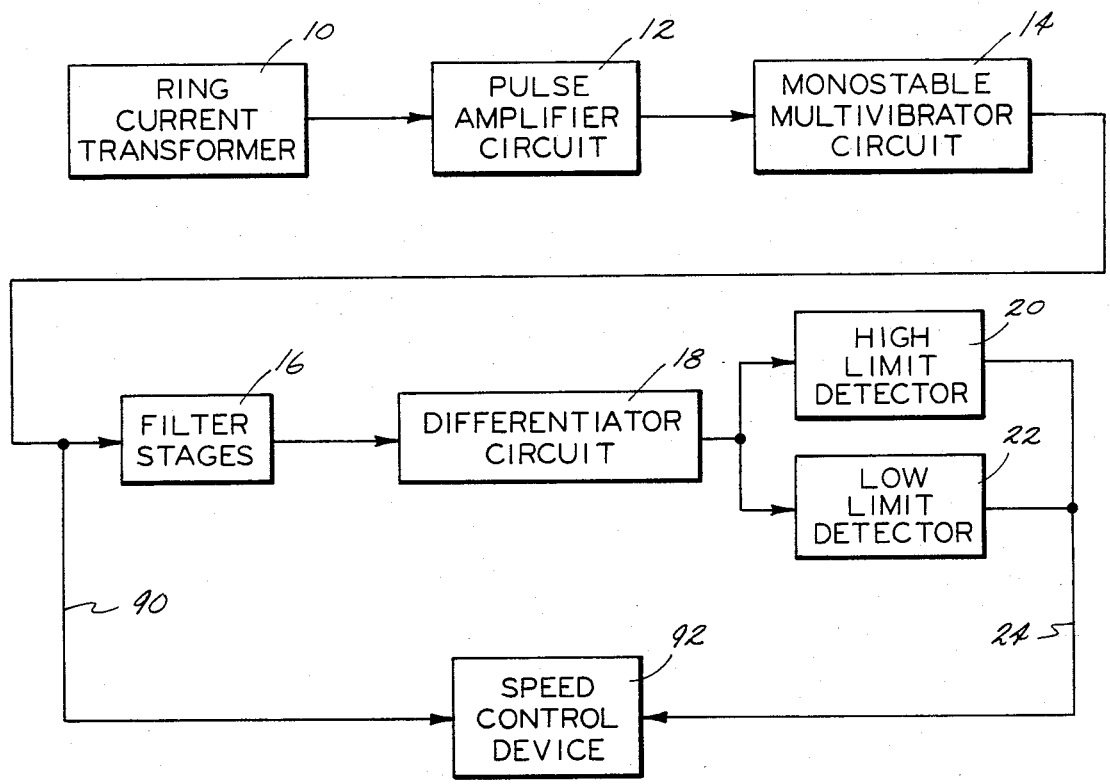
FIG. 3 is a block diagram of the entire electronic speed control system in accordance with the present invention.

Referring now to FIG. 3, there is illustrated a block diagram of the entire electronic speed control system in accordance with the present invention. The basic components of the electronic speed control disengagement circuit are identical to those described above and illustrated in FIG. 1. The output of the monostable multivibrator circuit 14 is connected by a line 90 to the vehicle speed signal input of an electronic speed control device 92. The output line 24 of the disengagement circuit is connected to the brake detection circuit of the speed control device 92 as described above. The speed control device 92 is conventional in the art and includes means for generating a signal representing a desired speed of the vehicle.

In order to operate properly, the speed control device 92 requires an electrical input signal which is representative of the actual speed of the vehicle. In prior art devices, this actual speed signal is generated in one of two manners. In the first instance, a magnetic sensor or shaft encoder is responsive to the mechanical rotation of a shaft in the engine or the drive train of the vehicle so as to generate a pulse train having a frequency proportional to the actual speed of the vehicle. Such an arrangement, however, is undesirable because the mechanical components are difficult to install properly and subject to failure from wear.

In the second instance, an electronic sensor is responsive to the generation of ignition current pulses at the ignition coil or the distributor of the vehicle so as to generate a pulse train signal to the speed control device. The frequency of the sensed ignition current pulses is proportional to the actual speed of the vehicle engine. Because speed control systems of this type are responsive to all of the ignition current pulses generated by the engine ignition system, they require an additional switch means to adjust the system for the different number of pulses generated per engine revolution by engines having different numbers of cylinders. For example, an eight cylinder engine will generate twice as many ignition current pulses per revolution than a four cylinder engine. Such a switch means provides an additional point of failure in the speed control system and further introduces additional cost and complexity thereto.

The electronic speed control system disclosed in FIG. 3 incorporates the advantages of generating the actual speed signal to the speed control device 92 by electronic sensing without increasing the cost or complexity of the system. The ring current transformer 10 is responsive to the ignition current pulses generated to only one of the plurality of cylinders in the engine over the spark plug wire for generating a signal proportional to the speed of the engine. The speed control device 92 is operatively connected to the vehicle engine and is responsive to the engine speed signal from the monostable multivibrator circuit 14 and the desired speed signal for controlling the speed of the engine and, hence, the speed of the vehicle in response thereto.

It will be appreciated that one ignition current pulse is applied to the spark plug wire for every two revolutions of the engine, regardless of whether the engine has four, six, or eight cylinders. Thus, the present electronic speed control device can be installed without modification or adjustment on any common automotive vehicle without regard to the number of cylinders in the engine. Additionally, the ring current transformer 10 can be installed much easier than any prior art device for generating a signal representative of the actual speed of the vehicle.

The ring current transformer 10 can be utilized solely as a means for generating a signal representative of the actual vehicle speed to the speed control device 92. In other words, the speed control disengagement circuit components consisting of the filter stages 16, the differentiator circuit 18, and the high and low limit detectors 20 and 22 can be removed from the circuit illustrated in FIG. 3. However, the present invention is particularly adapted to supply the actual vehicle speed signal to both the actual vehicle speed input and to the disengagement circuit of the speed control device 92.

In accordance with the provisions of the patent statutes, the principle and mode of operation of the present invention have been explained and illustrated in its preferred embodiment. However, the present invention can be practiced otherwise than as specifically explained and illustrated without departing from its or scope.

What is claimed is:

1. In a vehicle including an engine having a plurality of cylinders and an ignition system for generating pulses of electric current cyclically to each of the plurality of cylinders, an electronic speed control system for controlling the speed of the vehicle comprising:
    means responsive to the ignition current pulses generated to one of the plurality of cylinders for generating a pulse train at a frequency proportional to the speed of the engine;
    means responsive to the pulse train signal for generating a signal proportional to the speed of the engine;
    means for generating a signal representing a desired speed of the vehicle;
    means operatively connected to the engine and responsive to the engine speed signal and the desired speed signal for controlling the speed of the vehicle in response thereto;
    means for bypassing said engine speed signal generating means when the engine speed signal changes by more than a predetermined rate;
    differentiator means responsive to said engine speed signal generating means and said bypassing means for generating a signal representing the rate of change of the speed of the engine; and
    limit detector means responsive to the engine speed rate of change signal for generating a signal to disengage said means for controlling the speed of the vehicle when the engine speed rate of change signal changes beyond a predetermined range.

2. An electronic circuit for disengaging a speed control system on an automobile having an engine and an ignition system for generating pulses of electrical current to the engine comprising:
    means responsive to the ignition system current pulses for generating a pulse train at a frequency proportional to the speed of the engine;
    means responsive to the pulse train signal for generating a signal proportional to the speed of the engine;
    means for bypassing said engine speed signal generating means when the engine speed signal changes by more than a predetermined rate;
    differentiator means responsive to said engine speed signal generating means and said bypassing means for generating a signal representing the rate of change of the speed of the engine; and
    limiter detector means responsive to the engine speed rate of change signal for generating a signal to disengage the speed control system when the engine speed rate of change signal changes beyond a predetermined range.

3. An electronic circuit for disengaging a speed control system on an automobile having an engine and an ignition system for generating pulses of electrical current to the engine comprising:
    means responsive to the ignition system current pulses for generating a pulse train at a frequency proportional to the speed of the engine;
    filter means responsive to the pulse train signal for generating a signal proportional to the speed of the engine;
    means for bypassing said filter means when the engine speed signal changes by more than a predetermined rate;
    differentiator means responsive to said engine speed signal for generating a signal representing the rate of change of the speed of the engine; and
    limit detector means responsive to the engine speed rate of change signal for generating a signal to disengage the speed control system when the engine speed rate of change signal changes beyond a predetermined range.

4. The invention defined in claim 1 wherein said means responsive to the ignition current pulses includes a ring current transformer for generating a pulse train signal at a frequency proportional to the speed of the engine.

5. The invention defined in claim 2 wherein means responsive to the ignition system current pulses includes a ring current transformer for generating a pulse train signal at a frequency proportional to the speed of the engine and said engine speed signal generating means includes filter means responsive to the pulse train signal for generating a signal proportional to the speed of the engine.

6. The invention defined in claim 1 wherein said filter means includes a first low pass filter and a second low pass filter connected in series.

7. The invention defined in claim 6 wherein said means for bypassing bypasses said second low pass filter when the engine speed signal changes by more than a predetermined rate.

8. The invention defined in claim 7 wherein said means for bypassing said second filter means includes at least one diode connected in parallel with said second filter means.

9. The invention defined in claim 7 wherein said means for bypassing said second filter means includes a pair of oppositely biased diodes connected in parallel with said second filter means.

10. The invention defined in claim 2 further including means for preventing momentary fluctuations in the engine speed signal of less than a predetermined amount and duration from actuating said differentiator means to disengage the speed control circuit.

11. The invention defined in claim 3 wherein said means responsive to the ignition system current pulses includes a ring current transformer connected to a monostable multivibrator circuit.

12. The invention defined in claim 3 wherein said filter means includes a first low pass filter and a second low pass filter connected in series.

13. The invention defined in claim 12 wherein said means for bypassing includes at least one diode connected in parallel with said second filter means.

14. The invention defined in claim 12 wherein said means for bypassing includes a pair of oppositely biased diodes connected in parallel across said second filter means.

15. The invention defined in claim 3 further including means for preventing momentary fluctuations in the engine speed signal of less than a predetermined amount and duration from actuating said differentiator means to disengage the speed control circuit.

* * * * *